May 12, 1959
J. A. McINERNEY
2,886,353
SHAFT SEAL
Filed June 1, 1956
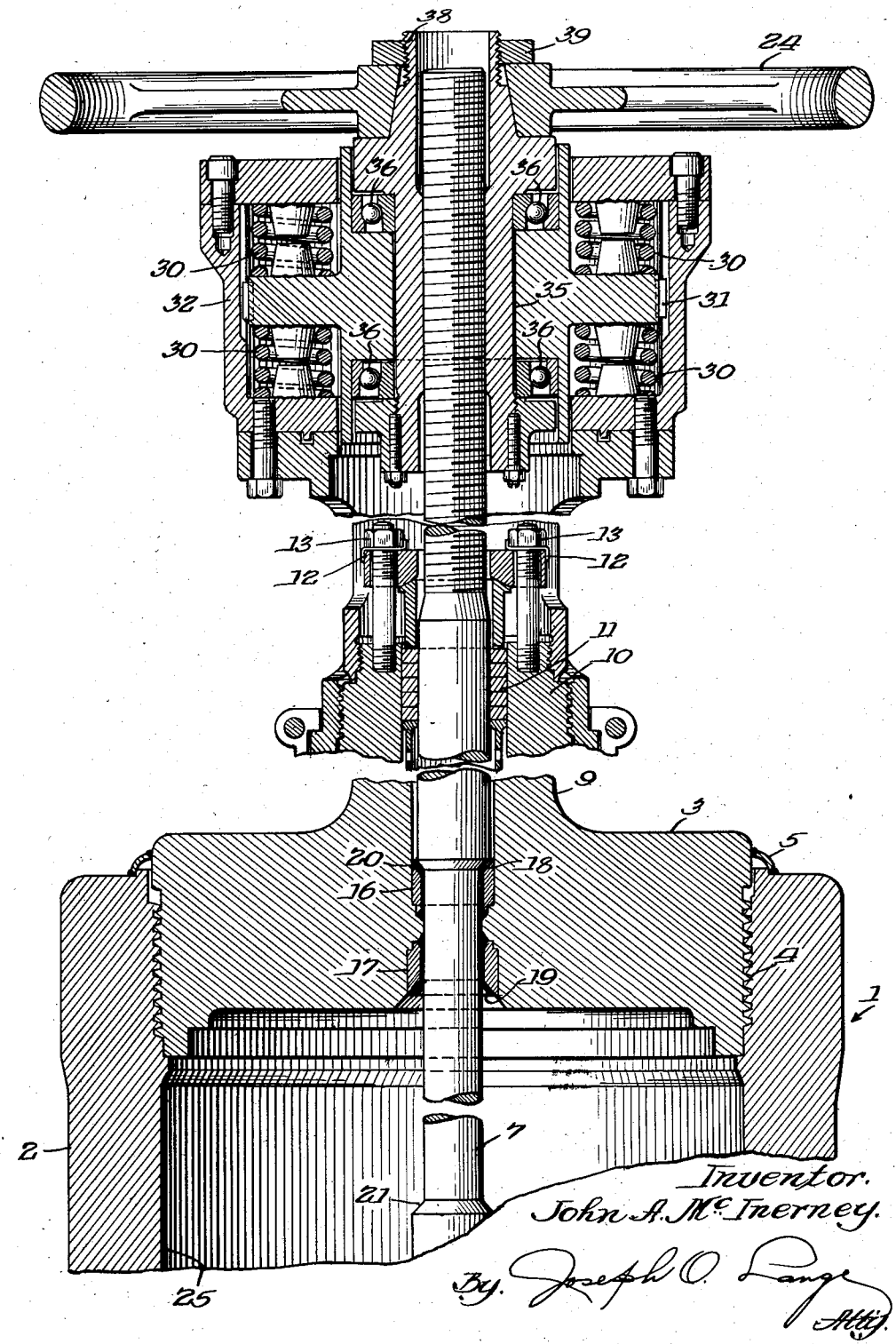
Inventor.
John A. McInerney.
By Joseph O. Lange
Atty.

United States Patent Office
2,886,353
Patented May 12, 1959

2,886,353
SHAFT SEAL

John A. McInerney, Evergreen Park, Ill., assignor, by mesne assignments, to the United States of America as represented by the United States Atomic Energy Commission Application June 1, 1956, Serial No. 588,864

10 Claims. (Cl. 286—36)

This invention relates generally to pressure vessels, such as valves, and more particularly it concerns fluid sealing of reciprocably movable shaft members extending outwardly from within a pressure vessel.

Ordinarily packing is relied on for sealing around reciprocably movable members such as valve stems. If what is termed backseating in the valve is provided, reliance is had on such packing when the valve stem is in the inward or valve closed position or else is moving or is fixed between the limits of the inward and outward positions.

It is common knowledge that a certain amount of fluid leakage and loss of internal pressure occurs even through new and freshly applied packing. Such leakage and pressure loss, however, is not considered serious in the ordinary installation since it is relatively slight. Where it exceeds certain limits of course as a result of subsequent wear and deterioration, repacking is necessary. Periodic inspection and maintenance are therefore required to keep this loss within allowable or reasonable limits. In some installations, on the other hand, even slight leakage is regarded more seriously. For instance, in the case of conduction and control of radio-active liquids under pressure as in atomic energy reactors even relatively slight leakage taking place in new packing is objectionable if allowed to continue over any substantial period of time because it will produce contamination on the outer surfaces which might be exceedingly dangerous. In some critical installations in which valves are operated at most only a few times a year, reliance can still be had on packing during movement between the open and closed positions so long as additional means are provided for fluid tight sealing in the end positions of the valve stem.

It is accordingly an object of the present invention to provide means for sealing off packing around a reciprocable member in each end position of said member whereby to preserve the packing in substantially undeteriorated, new condition where the reciprocable shaft member is only infrequently moved between the end positions representing for example the wide open and closed positions of a valve.

It is another object to provide positive fluid tight seating between a reciprocable shaft member and its housing in each end position of the shaft member so as to permit replacement of the packing around said member when the latter is in either end position.

It is a further object to provide fluid tight seating between a reciprocable shaft member and the housing at each end position of the shaft member and in conjunction therewith means for maintaining a definite seating thrust on said member in each of the end positions. This is accomplished regardless of the contraction and expansion of related parts due to temperature changes, thereby to insure positive fluid tight seating at all times.

Other objects and advantages will become more readily apparent upon proceeding with the following description read in light of the accompanying drawing in which the single figure shown is a fragmentary assembly view of a valve embodying a preferred form of the present invention.

Referring to the drawing in detail, the numeral 1 generally designates a valve such as for instance a gate valve having parallel valve seats (not shown) and the usual flow passage extending therethrough (also not shown). The valve housing within which the seats are provided consists of a body portion 2 and a bonnet or enclosing portion 3 received within the latter as by means of threading 4. A ring member 5 is welded to the body and bonnet at its outer and inner peripheries so as to provide a fluid tight connection between the said body and bonnet portions of the valve. Extending through the center of the bonnet is a reciprocably movable valve stem 7 or similar shaft member, on the lower end of which is mounted a valve disc or gate closure (not shown) for cooperation with the body parallel valve seats referred to previously. The closure member for example may comprise oppositely disposed disc parts retained in contact with the parallel seats in any well known manner.

The bonnet 3 is provided with an upwardly extending hollow portion 9 equipped with a stuffing box 10 having a suitable type of packing 11 secured by means of a gland member 12 and studs and nuts 13. Below said stuffing box, the bonnet is provided with a pair of ring members 16 and 17 in superposed relation and secured within the bonnet as by means of welding. These ring members present upper and lower frusto-conical seat surfaces 18 and 19 facing away from each other which may consist of hard metal inserts as shown in the drawing. The valve stem is provided with upper and lower frusto-conical seat surfaces 20 and 21 facing each other to define a reduced shaft portion therebetween. It will be understood that the said surfaces provide for fluid sealing engagement respectively with the upper and lower seat surfaces 18 and 19 of the bonnet at opposite end limit positions of the valve stem.

As previously brought out, a certain amount of leakage may occur even through new packing, the amount of course becoming greater as the packing is subjected to more and more wear and deterioration as a result of heat where the valve is used for the conduction of hot fluids and the action of corrosive or other injurious fluids carried in the line. Where for instance the fluids transmitted are especially hazardous, even slight leakage through packing if permitted to take place over any substantial period will cause contamination on the exterior of the valve. This contamination can be exceedingly dangerous to personnel. Such packing therefore is not especially suitable for the handling of such material. Where, however, valve operation takes place only once, twice or at most only a few times a year, such packing may still be used for sealing provided additional positive means of sealing are provided inwardly of the packing which are effective to seal off the packing in each end position of the valve stem or equivalent member. This means of sealing in the present construction consists of said upper and lower seating surfaces 18 and 19 on the bonnet and the coperating surfaces 20 and 21 on the stem providing positive sealing around the stem in each end limit position of the valve stem.

Where valves are used for conducting liquids under relatively high temperatures, it should be understood that after movement of the valve stem into either of the end limits of movement representing the open and closed positions of the valve and into sealed relation with the seating surfaces 18 or 19, certain temperature changes take place in the valve parts. Considering the movement of the valve stem into the lower end position, the valve disc or gate member (not shown) will have been placed in closed position and the upper stem seating surface 20 will have been placed in sealing engagement with the upper bonnet seating surface 18 by application of a certain amount of force on the handwheel 24 located at the upper end of the valve stem. Upon closing off of the flow channel through the lower part of the valve by interposition of the closure member in sealed relation between the parallel valve seats, flow of the high temperature liquid will have been stopped. At this time, however, the hollow interior or chamber portion 25 of the valve will contain the heated liquid. After closure of the flow passage through the valve, there can obviously be no further conduction or replenishment of the hot fluid through the valve and the body of liquid already present in the valve and the piping connected thereto will undergo a gradual heat loss due to radiation. The entrapped fluid within the valve chamber 25 will likewise undergo cooling by means of heat transmitted through the valve housing. It should be obvious after a certain period of time has elapsed that the temperature of the liquid within the flow passage of the valve and also the valve chamber will have been greatly reduced and that the valve parts within and adjacent said fluid will likewise have undergone a considerable lowering of temperature. Taking into consideration substantial temperature changes, it should be quite apparent that, if the valve stem seating surface 20 were in fluid tight engagement with the seat surface 18 of the valve bonnet when the valve stem was first moved into the lowermost gate closing position after the cooling process has been completed contraction of the valve parts will have taken place with the consequence that seating engagement between the surfaces 18 and 20 will have not been preserved due to a certain withdrawal of the surface 20 from surface 18. This is especially the case where a valve stem of considerable length is employed.

It should also be noted, where movement of the valve stem is in the opposite or upward direction so as to bring the lower seating surfaces 19 and 21 into engagement with each other and raise the valve closure member or gate (not shown), that fluid under the full temperature is again permitted to flow through the valve and fill the open valve chamber 25. This will result in a considerable rise in temperature of the valve parts coming into contact with this fluid. Inasmuch as the seat surfaces 19 and 21 of the bonnet and stem are first brought into fluid sealed engagement under relatively cool temperatures, it should likewise be evident after the temperature of the valve parts have been raised to that of the fluid coming into contact with the same that expansion of the valve parts will have taken place. The consequence is that the seat surface 21 of the stem will have moved slightly downwardly and out of engagement with the surface 19 of the bonnet so as to permit fluid leakage to occur between the two surfaces.

In order to take into account and overcome such adverse effects of contraction and expansion as a result of temperature changes special means are provided in the present construction. These means comprise a plurality of evenly spaced compression springs 30 arranged around the valve stem and interposed between a floating, vertically movable non-rotatably mounted flange member 31 and an upper housing portion 32 supporting the upper ends of the upper springs and lower ends of the lower springs, respectively. An intermediate yoke sleeve member 35 is mounted within the floating member by means of ball bearings 36 arranged for transmission of axial thrust in either direction. The intermediate member is also inwardly threaded for engagement of the threaded valve stem extending through the same. The upper end of the said yoke sleeve member 35 is provided with a conventional hexagonal portion 38 for reception of and rotation by the said handwheel 24. A lock nut 39 retains the handwheel on the intermediate member.

When the valve stem 7 is moved into the lowermost end position as representing the closed position of the valve 1, the seat surfaces 18 and 20 of the bonnet and stem are brought into fluid tight sealed relation. The positioning is effected by moving the valve stem downwardly through the intermediate member 35 by means of the handwheel and the threading between the valve stem and intermediate member. As previously brought out, due to temperature change of the valve parts, this fluid tight seating is not insured after cooling has taken place. In order to account for the effects of cooling, the present spring arrangement permits the handwheel to be further rotated in the direction of downward movement of the valve disc or gate which causes movement of the intermediate member 35 upwardly after tight abutting contact between the seat surfaces 18 and 20 has taken place. The floating member 31 is consequently carried up through force exerted through the lower thrust bearings which causes compression of the upper coil springs 30. By such further rotation of the handwheel in this direction considerable energy can be stored within the upper springs so that upon withdrawal or relaxation of the valve stem seating surface 20 from the surface 18 of the bonnet, the floating flange member 31, intermediate member 35, and valve stem 7 attached thereto will be moved downwardly or rather retained in the downward tight abutting position so as to preserve the fluid sealed realtion with the bonnet. A definite seating thrust on the stem and bonnet seat surface in a downward direction can therefore be maintained by means of these springs and intermediate structure sufficient to take care of the maximum amount of temperature change of the valve parts, so as to always insure a tight seating contact between the stem and the bonnet. It is therefore seen that the packing 11 above the point of stem seating is sealed off from the hazardous fluid so as to be preserved in substantially new and undeteriorated condition for maximum sealing effectiveness, when the valve stem is in such lower end or valve seated position.

When the valve stem is moved axially into the uppermost end position so as to place the stem annular surface 21 into tight sealing engagement with the seat surface 19 of the bonnet, further rotation of the handwheel in this direction will move the intermediate member 35 and the floating flange member 31 downwardly, thus compressing the lower coil springs 30. Considerable energy can again be stored in these lower springs, preloading the valve stem in an upper direction so that upon any relaxation of the seating surface 21 from the surface 19 of the bonnet, the valve stem will be moved upwardly or rather retained in the upper tight abutting position so as to preserve the fluid tight sealing with the bonnet. Again a definite seating thrust on the stem and bonnet seat surface, this time in an upward direction, is maintained sufficient to take care of the maximum amount of temperature change of the valve parts. Again the packing is preserved in substantially new condition when the valve is in this position.

It should accordingly be appreciated that the valve packing is effectively sealed off from the interior of the valve by means of the upper and lower stem seating in either end position of the valve stem so as to preserve the stem packing substantially in undeteriorated condition so long as the valve remains in either the upper or lower position most of the time and is operated only occasionally. The occasional use to which the packing will be put in preventing escape of fluid through the same when the valve is moved between the upper and closed limit positions will not be sufficient to cause undesirable deterioration or wear of this packing. The present arrangement accordingly may be employed in atomic energy reactors where valves are used for standby purposes, without any ill effects. It is also contemplated that such packing will last the life of the valve where a motor operator is used and the valve is located in an unaccessible place within a submarine or other combat ship or where it is inconvenient to require continuous inspection and maintenance by way of repacking.

It is accordingly seen that a novel construction has been provided for valves or other devices, in which positive, unfailing fluid tight sealing is maintained in either end position of the stem or reciprocable member so as to prevent undue wear and deterioration of packing as a result of high temperatures, the action of fluids and ordinary use. Maintenance by way of periodic inspection and repacking is therefore eliminated in many valve uses. Further, if repacking should be desired or deemed necessary in some valve installations, such repacking may be had when the valve or other member is in either end position.

Although a particular embodiment of the present invention has been disclosed and described, it is not desired to so limit the invention, but modifications and other embodiments are within the inventor's contemplation. The invention should accordingly be limited only by the appended claims read in the light and spirit of the over-all invention.

I claim:

1. In a pressure vessel having a housing containing a chamber, a non-rotatable reciprocable shaft member extending from within to exterior of said chamber, said pressure vessel being provided with stuffing box means through which said shaft member extends and a pair of oppositely facing seat surfaces between said stuffing box means and chamber surrounding said shaft member, said shaft member having a pair of oppositely facing seating surfaces abuttingly engageable alternatively with said seat surfaces of the housing when the shaft member is at opposite limits of reciprocal movement thereof for fluid tight sealing around said shaft member and shutting off of fluid pressure to said stuffing box means, in each of said limiting positions, a rotatable member operatively engaging said shaft member for endwise movement of the shaft member upon rotation of said rotatable member, non-rotatable means extending around said rotatable member reciprocally movable with said rotatable member, said non-rotatable means having oppositely directed surface means each facing in one direction of the reciprocal movement thereof, resilient means abutting said oppositely directed surface means and means supporting said resilient means, said resilient means normally retaining said non-rotatable means, rotatable member and engaged shaft member in a floating forced balanced position, said non-rotatable means and rotatable member moving at least slightly in the opposite directions of their reciprocal movement and in opposition to the resilient means respectively upon engagement of each of said seating surfaces of the shaft member with the respective seat surface of the housing in turn and at least slight continued rotation of said rotatable member whereby to tension said seating surfaces of the shaft member against the respective seat surfaces of the housing.

2. In a pressure vessel having a housing containing a chamber, a non-rotatable reciprocable member extending from within to exterior of said chamber, the portion of the pressure vessel through which said reciprocable member extends being provided with a pair of oppositely facing seat surfaces extending around said reciprocable member, said reciprocable member having a pair of oppositely facing seating surfaces abuttingly engageable alternatively with said seat surfaces of the housing at opposite limits of reciprocal movement of said reciprocable member for fluid tight sealing around said reciprocable member in each of these limiting positions, a rotatable member operatively engaging said reciprocable member for endwise movement of the reciprocable member upon rotation of said rotatable member, a flange member on the said rotatable member reciprocally movable with said rotatable member, means to restrain said flange member against rotation, resilient means engaging oppositely facing side surface means of said flange member to retain each of the seating surfaces of said reciprocable member against the respective vessel seat surface in turn at said opposite limits of reciprocable movement of the reciprocable member, upon at least slight continued rotation of said rotatable member in the directions of tightening of each of the seating surfaces of the reciprocable member against the corresponding seat surface of the vessel in turn at said opposite end limits of movement of the reciprocal member whereby said rotatable member and flange member are moved at least slightly in the opposite directions of their reciprocal movement in turn and in opposition to the resilient means, respectively, engaging the oppositely facing side surface means of the flange member.

3. In a pressure vessel having a housing containing a chamber, a non-rotatable reciprocable stem member extending from within to the exterior of said chamber, the portion of the pressure vessel through which said stem member extends being provided with a pair of oppositely facing seat surfaces extending around said stem member, said stem member having a pair of seating surfaces engageable alternatively with said seat surfaces of the vessel at opposite limits of reciprocal movement of said stem member for fluid tight sealing around said stem member in each of these limiting positions, a rotatable yoke sleeve operatively engageable with said stem member for endwise movement of the stem member upon rotation of said yoke sleeve, a non-rotatable floating flange member engaging said yoke sleeve and reciprocally movable with said yoke sleeve, annularly mounted resilient means supported on said housing and shouldering against respective oppositely facing side surface means of said flange member effective to retain the seating surfaces of the stem member against the seat surfaces of the housing in fluid tight relation therewith in each of the end limits of movement of the stem member, upon at least slight continued rotation of said yoke sleeve in the directions of tightening of each of the seating surfaces of the stem member against the corresponding seat surface of the vessel in turn at said opposite end limits of movement of the stem member whereby said yoke sleeve and flange member are movable at least slightly in the opposite directions of their reciprocal movement in turn and in opposition to the resilient means, respectively, engaging the oppositely facing side surface means of the flange member.

4. The subject matter of claim 3, the said resilient means being interposed between the said floating flange member and said housing and comprising annularly arranged spaced apart springs.

5. In a valve structure or the like pressure vessel having a threaded non-rotatable reciprocally movable shaft having axially spaced apart annular seat portions thereon, the combination therewith of a body portion, a bonnet for the said body portion, an intermediate rotatable yoke sleeve threadedly receiving said shaft, a flange member disposed around the said yoke sleeve in substantially fixed axial relation to the said yoke sleeve, housing means for the said yoke sleeve and flange member, resilient means mounted in the housing means in a plurality of planes engaging the said flange member, the said yoke sleeve and flange member being limitedly biased by said resilient means at end limits of movement of said reciprocally movable shaft and upon at least slight continued rotation of said yoke sleeve, said bonnet having a wall portion for journally receiving a portion of the said shaft, the said wall portion around the shaft having axially spaced apart seats for predetermined engagement selectively by the said shaft annular seat portions at opposite end limits of movement of the shaft, the axial spacing of the said shaft seat portions being greater than the axial spacing of the wall portion seats, the axial spacing of said shaft seat portions substantially defining the limits of the reciprocable movement of the said shaft.

6. In a pressure vessel having a housing containing a chamber, a reciprocable member extending from within to exterior of said chamber, the portion of the pressure vessel through which said reciprocable member extends being provided with a pair of oppositely facing seat surfaces extending around said reciprocable member, said reciprocable member having a pair of oppositely facing seating surfaces extending therearound, said latter seating surfaces being abuttingly engageable alternatively with said seat surfaces of the vessel at opposite limits of reciprocal movement of said reciprocable member for fluid tight sealing around said reciprocable member in each of these limiting positions, means extending around said reciprocable member having a portion operatively engaging said member for endwise movement of said member upon relative rotation therebetween, means resiliently mounting said means extending around said reciprocable member for reciprocal movement of said latter extending means relative to said housing and in the directions of the reciprocal movement of said reciprocable member, said resilient means normally retaining said means extending around said reciprocable member in a floating force balanced position, means supporting said resilient means for the resilient mounting of said means extending around said reciprocable member, said means extending around said reciprocable member moving at least slightly in the opposite directions of its reciprocal movement and in opposition to at least part of said resilient means upon engagement of each of said seating surfaces of said reciprocable member with the respective seat surface of the vessel in turn and at least slight continued rotation of one of said reciprocable member and at least said portion of said means extending around said reciprocable member whereby to tension said seating surfaces of the reciprocable member against the respective seat surfaces of the vessel.

7. In a pressure vessel having a housing containing a chamber, a reciprocable member extending from within to exterior of said chamber, the portion of the pressure vessel through which said reciprocable member extends being provided with a seat surface extending around said reciprocable member, said reciprocable member having a seating surface extending therearound abuttingly engageable with said seat surface of the vessel at one end limit of reciprocal movement of the member for fluid tight sealing therearound, means extending around said reciprocable member having a portion operatively engaging said member for endwise movement of said member upon relative rotation therebetween, said means extending around said reciprocable member being reciprocally movable relative to said housing and in the same directions as the reciprocable member, said means extending around said reciprocable member having oppositely directed surface means each facing in one direction of the reciprocal movement, means abutting said oppositely directed surface means and means supporting said abutting means, said abutting means including resilient means engaging the surface means of said means extending around said reciprocable member facing in one of the directions of the reciprocable movement, said abutting means normally retaining said means extending around said reciprocable member in a substantially fixed position, said means extending around said reciprocable member moving at least slightly in opposition to said resilient means upon engagement of said seating surface of said reciprocable member with said seat surface of the vessel and at least slight continued rotation of one of said reciprocable members and at least said portion of said means extending around said reciprocable member whereby to tension said seating surface of the reciprocable member against said seat surface of the vessel.

8. In a pressure vessel having a housing containing a chamber, a reciprocable member extending from within to exterior of said chamber, the portion of the pressure vessel through which said reciprocable member extends being provided with a seat surface extending around said reciprocable member, said reciprocable member having a seating surface extending therearound abuttingly engageable with said seat surface of the vessel at one end limit of reciprocal movement of the member for fluid tight sealing therearound, means extending around said reciprocable member having a portion operatively engaging said member for endwise movement of said member upon relative rotation therebetween, said means extending around said reciprocable member being reciprocally movable relative to said housing and in the same directions as the reciprocable member, means engaging and normally preventing reciprocal movement of said means extending around said reciprocable member thereby to normally retain said means in a substantially fixed position, said means engaging said means extending around said reciprocable member comprising resilient means, support means for said means engaging said means extending around said reciprocable member, said means extending around said reciprocable member moving at least slightly in opposition to said resilient means upon engagement of said seating surface of said reciprocable member with said seat surface of the vessel and at least slight continued rotation of one of said reciprocable members and at least said portion of said means extending around said reciprocable member whereby to at least initially tension said seating surface of the reciprocable member against said seat surface of the vessel.

9. In combination with a fluid vessel having seat surface means, reciprocable means having seat surface means abuttingly engageable with said seat surface means of the vessel at one end limit of reciprocal movement of said reciprocable means, means extending around said reciprocable means having a portion operatively engaging said reciprocable means for endwise movement of said reciprocable means upon relative rotation therebetween, said means extending around said reciprocable means being reciprocally movable relative to said vessel and in the same directions as the reciprocable means, means engaging and normally preventing reciprocal movement of said means extending around said reciprocable means, said means engaging said means extending around said reciprocable means comprising resilient means, support means for said means engaging said means extending around said reciprocable means, said means extending around said reciprocable means moving at least slightly in opposition to said resilient means upon engagement of said seat surface means of said reciprocable means with said seat surface means of the vessel and at least slight continued rotation of one of said reciprocable means and at least said portion of said means extending around said reciprocable means whereby to at least initially tension said seat surface means of the reciprocable means against said seat surface means of the vessel.

10. In combination with a fluid vessel having seat surface means, reciprocable means having seat surface means abuttingly engageable with said seat surface means of the vessel at one end limit of reciprocal movement of said reciprocable means, means engaging said reciprocable means for moving the same in reciprocal movement, said means engaging said reciprocable means having a portion for the actual engagement with said reciprocable means, at least said portion being movable relative to said reciprocable means in opposite directions for movement of the latter in the opposite directions of reciprocal movement, means mounting said means engaging said reciprocable means, said mounting means comprising resilient means, support means for said mounting means, said means engaging said reciprocable means moving at least slightly in opposition to said resilient means upon engagement of said seat surface means of said reciprocable means with said seat surface means of the vessel and at least slight continued movement of at least said portion of said means engaging said reciprocable means in the direction of tightening of said seat surface means of the reciprocable means with the seat surface means of the vessel whereby to at least initially tension said seat surface means of the reciprocable means against said seat surface means of the vessel.

References Cited in the file of this patent

UNITED STATES PATENTS

| | | |
|---|---|---|
| 727,225 | Sturtz | May 5, 1903 |
| 863,409 | Leib et al. | Aug. 13, 1907 |
| 1,851,561 | Baninger | Mar. 29, 1932 |
| 2,694,547 | MacGregor | Nov. 16, 1954 |